United States Patent
Krämer (10) Patent No.: US 9,238,506 B2
(45) Date of Patent: Jan. 19, 2016

(54) AIRCRAFT SEAT DEVICE

(75) Inventor: Marco Krämer, Wolpertshausen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 445 days.

(21) Appl. No.: 13/577,934

(22) PCT Filed: Feb. 16, 2011

(86) PCT No.: PCT/EP2011/000743
§ 371 (c)(1),
(2), (4) Date: Sep. 27, 2012

(87) PCT Pub. No.: WO2011/101134
PCT Pub. Date: Aug. 25, 2011

(65) Prior Publication Data
US 2013/0020846 A1    Jan. 24, 2013

(30) Foreign Application Priority Data
Feb. 18, 2010    (DE) .................. 10 2010 008 460

(51) Int. Cl.
B64D 11/06    (2006.01)

(52) U.S. Cl.
CPC ............ B64D 11/06 (2013.01); B64D 11/0624 (2014.12); Y02T 50/46 (2013.01)

(58) Field of Classification Search
USPC ..................................................... 297/217.3
See application file for complete search history.

(56) References Cited

U.S. PATENT DOCUMENTS

| | | | |
|---|---|---|---|
| 3,776,305 A | 12/1973 | Simmons | |
| 3,977,206 A | 8/1976 | Simmons | |
| 5,409,186 A | 4/1995 | Chow | |
| 6,179,381 B1 | 1/2001 | Gevaert | |
| 6,802,568 B1 | 10/2004 | Johnson | |
| 2004/0212228 A1 | 10/2004 | Skelly et al. | |
| 2005/0040289 A1 | 2/2005 | Smallhorn | |
| 2005/0264047 A1 | 12/2005 | Bauer | |
| 2006/0102784 A1* | 5/2006 | Callahan et al. | 244/118.6 |
| 2007/0132303 A1 | 6/2007 | Baumann | |
| 2010/0201166 A1 | 8/2010 | Merensky et al. | |
| 2011/0079682 A1* | 4/2011 | Raybell et al. | 244/122 R |

FOREIGN PATENT DOCUMENTS

| | | |
|---|---|---|
| DE | 2 308 644 A | 2/1973 |
| DE | 10 2004 026 023 A1 | 12/2005 |
| DE | 10 2006 049000 A1 | 4/2008 |
| DE | 10 2009 006 758 A1 | 8/2010 |

(Continued)

OTHER PUBLICATIONS

International Search Report mailed on Sep. 30, 2011 for the corresponding International patent application No. PCT/EP2011/000743 (English copy enclosed).

(Continued)

*Primary Examiner* — David R Dunn
*Assistant Examiner* — Timothy J Brindley
(74) *Attorney, Agent, or Firm* — Posz Law Group, PLC (57) ABSTRACT

An aircraft seat, including at least one electronics unit and at least one seat frame unit. The electronics unit is at least partially arranged in a hollow space spanned by the seat frame.

13 Claims, 9 Drawing Sheets

(56) References Cited

FOREIGN PATENT DOCUMENTS

| EP | 1 795 444 A2 | 6/2007 |
|---|---|---|
| EP | 1 795 444 A3 | 2/2012 |
| WO | WO 94/20327 A1 | 9/1994 |
| WO | WO 2005/060598 A2 | 7/2005 |
| WO | WO 2010/086168 A1 | 8/2010 |

OTHER PUBLICATIONS

German Search Report mailed on Feb. 8, 2011 for the corresponding German patent application No. 10 2010 008 460.3.

Office Action dated May 11, 2015 issued in corresponding EP patent application No. 11 708 697.5 (and partial English translation).

German Search Report issued from the German Patent Office dated Feb. 8, 2011 for the corresponding DE patent application No. 10 2010 008 460.3 (partial English translation only).

International Preliminary Report on Patentability dated Aug. 21, 2012 issued in corresponding International patent application No. PCT/EP2011/000743 (English translation only).

\* cited by examiner

AIRCRAFT SEAT DEVICE

CROSS REFERENCE TO RELATED APPLICATIONS

This application is a U.S. national stage application of PCT/EP2011/000743 filed on Feb. 16, 2011, and claims priority to, and incorporates by reference, German patent application No. 10 2010 008 460.3 filed on Feb. 18, 2010.

BACKGROUND

Aircraft seat devices having an electronics unit and a seat frame unit are already known, the electronics unit being secured on an underside of a seat base, which is supported on an aircraft floor via the seat frame unit.

SUMMARY

An aircraft seat device having at least one electronics unit and at least one seat frame unit, wherein the electronics unit is arranged at least partially in a hollow space defined by the seat frame unit, is proposed. Furthermore, an aircraft seat device having at least one electronics unit which has at least one supply unit for at least two components, and having at least one seat component, wherein the electronics unit is arranged at least partially in a hollow space defined by the seat component, is proposed. It is thereby possible to provide a solution with a design which saves a particularly large amount of space overall through advantageous use of a previously unused hollow space.

In this context, "seat frame unit" should be understood, in particular, to mean a unit provided for transmitting a weight force of at least one seat base and/or at least one backrest and, in particular, a weight force acting on the seat base and/or the backrest, to an aircraft floor. "Provided" should in all cases be understood to mean specifically equipped, designed and/or programmed. In particular, the seat frame unit has at least one seat leg, a seat divider which an armrest and/or a backrest is secured to, and/or at least one seat support beam, which is, in particular, aligned transversely to a sitting direction and which, in particular, is provided for the purpose of transmitting weight forces of the seat base and/or the backrest to the seat legs. "Hollow space" should be understood, in particular, to mean a space bounded on at least three sides by the component part forming the hollow space. For this purpose, the component part forming the hollow space can have a concave region, e.g. a U-shaped and/or V-shaped region, and/or preferably has, in at least one plane, a closed profile, within which the hollow space is arranged or by which the hollow space is surrounded in at least one plane. For this purpose, the component part forming the hollow space can, in particular, have the concave region on an outer side of an outer wall of the component part. The hollow space is preferably arranged within a component part of the seat frame unit, particularly preferably in a seat leg, in a seat divider and/or particularly advantageously in a seat support beam. If the hollow space is bounded at least partially by a seat support beam, it is possible, in a design which saves a particularly large amount of space overall, to use an advantageous hollow space, especially if the seat support beam is formed by a single seat support beam. "Single seat support beam" should be understood, in particular, to mean a seat support beam which is provided for the purpose of accepting torsional moments, in particular for use as an only crossbeam in a row of seats, via which weight forces of several seat bases and/or backrests are transmitted to seat legs.

"Seat components" should be understood to mean all the components of an aircraft seat, such as the seat base, the backrest, a seat casing, components of a seat frame unit etc. "Electronics unit" should be understood, in particular, to mean a unit which goes beyond a mere line and a mere plug, comprising at least one passive and/or, in particular, at least one active electronic component which is provided, in particular, at least in part for supplying power and/or, in particular, for processing data, for storing data, for open-loop and/or closed-loop control. "Supply unit for at least two components" should be understood, in particular, to mean a unit which is provided for the purpose of storing, making available and/or processing power and/or, in particular, data for at least two separate components, e.g. monitors, PC supply units, seat actuators, especially for separate seats. In particular, the electronics unit can be provided as an auxiliary unit for another data box to enable the other data box to be made as small and light-weight as possible. Through an appropriate configuration, existing, previously unused spaces can be used in an advantageous manner, and additional component parts, such as in particular additional housing elements, installation space and weight can be saved.

It is furthermore proposed that the seat frame unit have an access unit, which is provided for the purpose of allowing access to the hollow space in a direction oriented perpendicularly to a main extension direction of the seat frame unit in a floor-mounted state of the seat frame unit. In this context, "main extension direction" should be understood, in particular, to mean a direction which is parallel to an outer contour of the seat frame unit, and in which the seat frame unit has a maximum dimension. It is thereby possible to provide a solution that can be maintained and repaired in a simple manner, despite using the previously unused installation space.

If the access unit comprises a covering unit for covering the access to the hollow space, an electronics unit arranged behind the covering unit can be protected, in a particularly effective manner, from environmental influences and from unwanted interference by unauthorized persons.

It is furthermore proposed that the covering unit have a fixing means for fixing an installation position of the electronics unit. The fixing unit is preferably connected securely but detachably to the electronics unit. In this context, "connected securely but detachably" should be understood, in particular, to mean that a spatial separation of the fixing unit and the electronics unit is provided without any damage thereto, the separation requiring the use of tools. As an alternative, the fixing unit can be provided so as to form a positive-locking connection to the electronics unit in order to fix the installation position of the latter. In another embodiment, it is furthermore possible for the fixing unit to be configured to be connected integrally and, in particular, by a material bond to at least part of a housing unit of the electronics unit. It is thereby possible to combine covering of the access to the hollow space with reliably fastening the electronics unit to give a particularly compact solution.

It is furthermore proposed that the fixing means be at least partially matched to an outer contour of the seat frame unit in an installed state of the covering unit.

In this context, this should be taken to mean, in particular, that at least part of an outer edge region of the fixing means runs substantially parallel to a contact surface of the fixing means with the access unit. It is thereby possible to enable particularly good thermal coupling of the fixing means to the access unit of the seat frame unit, and to achieve good dissipation of waste heat from the electronics unit.

If the electronics unit is designed at least partially without a housing, it is, in particular, possible to save additional weight. "Without a housing" should be understood, in particular, to mean that the electronics unit has at least two passive and/or, in particular, active electronic components, which are preferably provided at least in part for processing data, storing data and/or supplying power, and are arranged adjacent to one another without a housing jointly enclosing said two electronics units.

In another embodiment of the invention, it is proposed that the aircraft seat device have at least one slide-in fastening element, onto which the electronics unit is slid in the mounted state. The slide-in fastening element is preferably formed by a rail which, when viewed in the mounted state, is advantageously aligned in a longitudinal direction of the hollow space and, in particular, in the longitudinal direction of the seat support beam. Through corresponding embodiment, easy assembly can be achieved, in particular by providing the slide-in fastening element for preassembly in the hollow space before the electronics unit is slid onto the slide-in fastening element. The slide-in fastening element preferably has a guide channel and/or a raised guide portion in order to guide the electronics unit when it is slid on and/or, in particular, to hold it in a positive-locking manner, in particular transversely to the longitudinal direction and parallel to a supporting surface of the slide-in fastening element and/or transversely to the longitudinal direction and in a direction away from the supporting surface.

If the electronics unit has at least one plug plate oriented in a longitudinal direction of the electronics unit, simple coupling respectively cable connection of the electronics unit to input-side and/or output-side units can be ensured. Herein, "plug plate" should be understood, in particular, to mean a unit having at least two, preferably at least three, plug connections, at least some of which are preferably arranged in one plane. Herein, "plug connection" should be understood, in particular, to mean a male and/or female plug-in means, such as a pin and/or a receptacle.

If the electronics unit has a fastening plate spaced apart, in the longitudinal direction, from the plug plate on a side facing the plug plate, advantageous fastening of the electronics unit can be ensured and an advantageous free space for a simple cable connection of the electronics unit can be achieved. In this context, "spaced apart" should be understood, in particular, to mean that the fastening plate and the plug plate are spaced apart in the longitudinal direction by at least 1 cm, preferably by several centimeters, thus providing, in particular, an interspace with a length in the longitudinal direction of at least 1 cm and preferably of several centimeters.

BRIEF DESCRIPTION OF THE DRAWINGS

Further advantages will emerge from the following description of the drawing. In the drawing, embodiments of the invention are shown. The description and the claims contain numerous features in combination. A person having ordinary skill in the art will expediently also consider the features individually and combine them into appropriate additional combinations.

DETAILED DESCRIPTION

Figure 1:
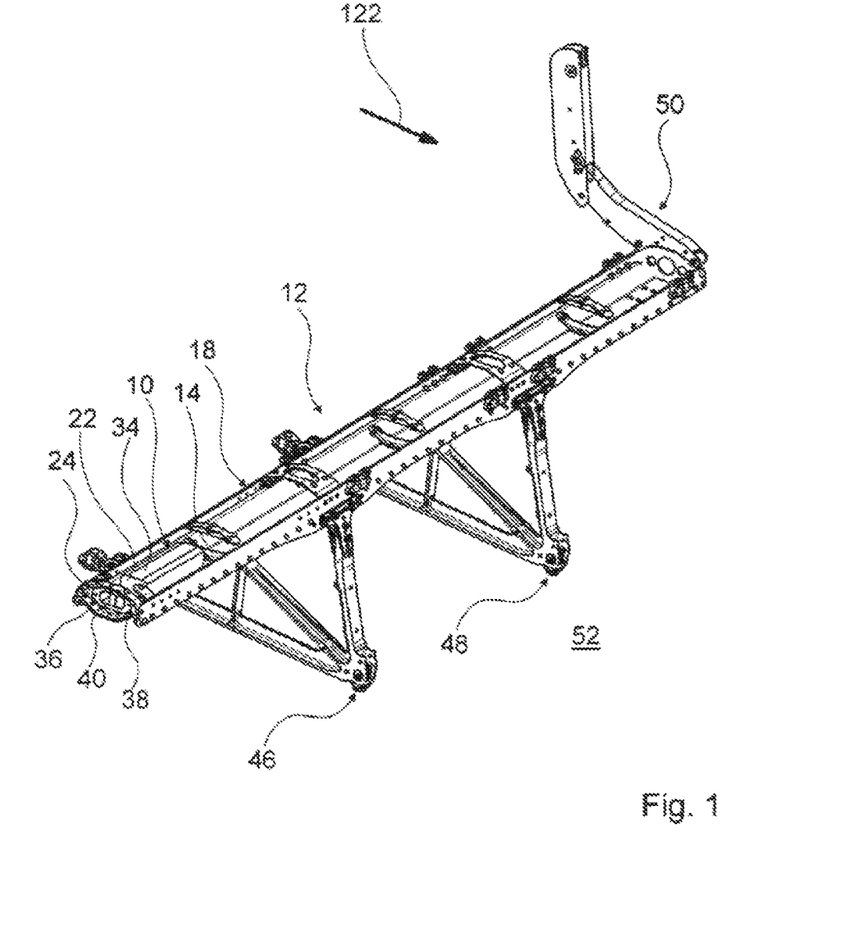
FIG. 1 is a perspective view of individual parts of an aircraft seat having an aircraft seat device according to the invention, obliquely from above.
Figure 2:
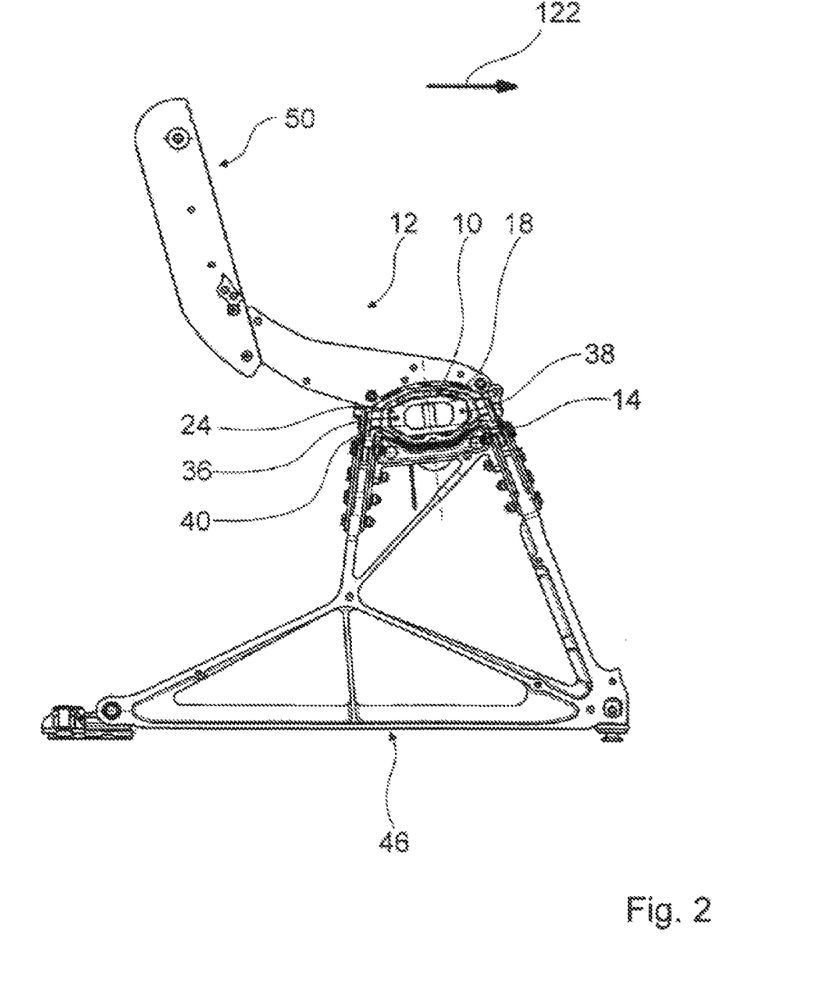
FIG. 2 is a side view of the individual parts from FIG. 1.
Figure 3:
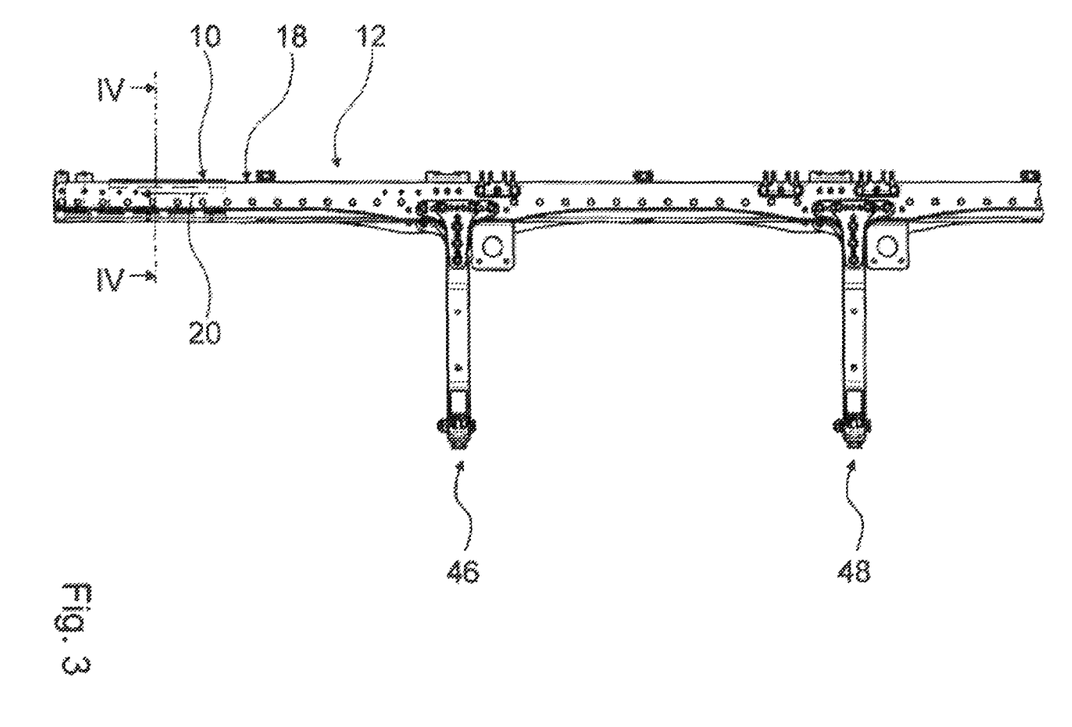
FIG. 3 is a front view of the individual parts.

FIG. 1 shows individual parts of an aircraft seat having an aircraft seat device according to the invention obliquely from above. The aircraft seat device comprises an electronics unit 10 and a seat component formed by a seat frame unit 12, wherein the electronics unit 10 is arranged in a hollow space 14 defined by the seat frame unit 12. The electronics unit 10 has a supply unit 16 for a plurality of components, in particular for a plurality of monitor units (not specifically shown) and for a plurality of seat control units (not specifically shown) for a plurality of aircraft seats in a row of seats, floor-mounted in a known manner on an aircraft floor 52. For this purpose, the electronics unit 10 is connected to the plurality of monitor units and to the plurality of seat control units directly and/or indirectly, e.g. via a hub, which is provided, in particular, to connect network nodes in a star shape.

The hollow space 14 is bounded by a seat support beam 18, more specifically by a single seat support beam, and is surrounded in a plane transverse to the longitudinal direction of the single seat support beam by a closed profile of the single seat support beam (FIGS. 1 to 4). The single seat support beam has an upper shell 28 and a lower shell 30 (FIGS. 2 and 4), which form the closed profile, the upper shell 28 being omitted in FIGS. 1 and 3 to better illustrate the electronics unit 10. The seat support beam 18 is made of aluminum, thereby making it possible to ensure advantageous heat dissipation from the electronics unit 10. The seat support beam 18 is connected to seat legs 46, 48 and to seat dividers 50 and is arranged transversely to a sitting direction 122. A plurality of seat bases (not specifically shown) and backrests of aircraft seats of the row of seats are attached to the seat support beam 18. The seat support beam 18 is used, in particular, to transmit to the seat legs 46, 48 forces acting on the seat bases and on the backrests of the row of seats.

Figure 5:
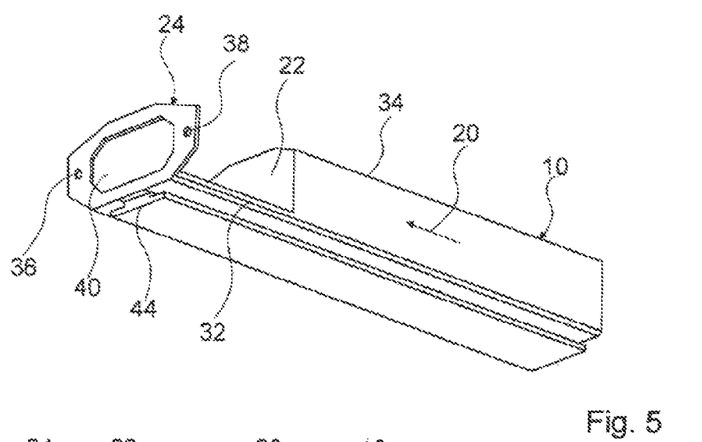
FIG. 5 is an individual view of an electronics unit of the aircraft seat device obliquely from below.
Figure 6:
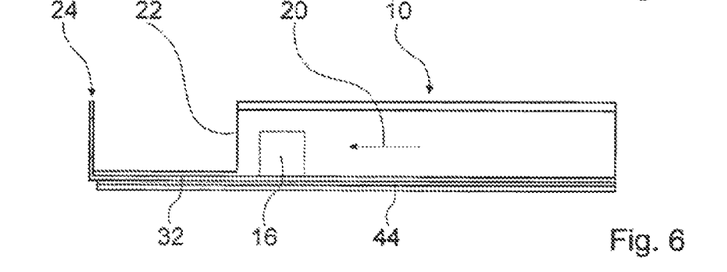
FIG. 6 is a side view of the electronics unit.
Figure 7:
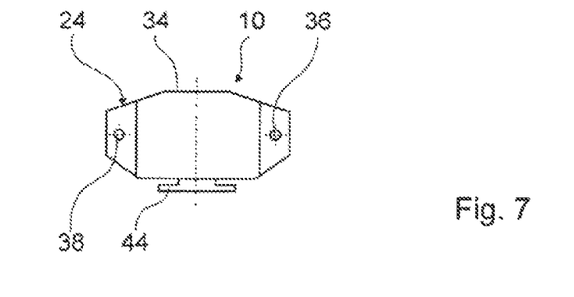
FIG. 7 is a rear view of the electronics unit.

The electronics unit 10 has a support plate 32 and a plug plate 22, which is arranged on the support plate 32, is oriented in the longitudinal direction 20 thereof and closes off a housing unit 34 of the electronics unit 10a (FIGS. 5 to 7). The electronic components of the electronics unit 10 are arranged on the support plate 32. The support plate 32 is made of a metallic material, namely aluminum, thereby ensuring particularly advantageous heat dissipation. The plug plate 22 comprises plugs (not specifically shown) for cable connection of the electronics unit 10. The outer contour of the housing unit 34 is matched to an inner contour of the seat support beam 18. Here, "matched" should be understood, in particular, to mean that, in at least one plane transverse to the longitudinal extent of the seat support beam 18, there is, in the region of the housing unit 34, an interface between the outer contour of the housing unit 34 and the inner contour of the seat support beam 18, which is less than 30%, preferably less than 20%, and particularly preferably less than 10% of a total area defined by the inner contour of the seat support beam 18 in said plane.

Figure 9:
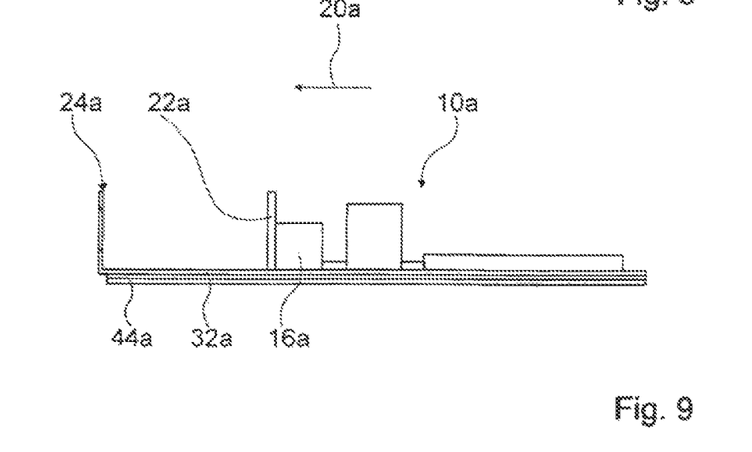
FIG. 9 is a schematic view of alternative electronics unit.

Instead of an electronics unit 10 with a housing unit 34, it would also be possible to provide an electronics unit 10a designed at least partially without a housing, as illustrated schematically in FIG. 9. The electronics unit 10a has a plurality of electronic components, which are provided for processing data and/or storing data and are arranged adjacent to one another without a common housing surrounding them.

On a side facing the plug plate 22, the electronics unit 10 has a fastening plate 24 spaced apart from the plug plate 22 in a longitudinal direction 20. The fastening plate 24 is used for fastening to an outer rib of the seat support beam 18 and, for this purpose, has two fastening apertures 36, 38. The fastening plate 24 furthermore has an aperture 40 arranged in a central region thereof, said aperture 40 allowing advantageous cable routing from the plug plate 22 out of the hollow space 14. Cables coupled to the plug plate 22 are passed out of the hollow space 14 through the aperture 40 at a front end of the seat support beam 18. Outside the hollow space 14 respectively outside the seat support beam 18, the cables are advantageously guided onwards in cable ducts (not specifically shown) which are fastened to an underside of the seat support beam 18. Advantageous contacting of the electronics unit 10 is ensured by means of an interspace which is formed between the plug plate 22 and the fastening plate 24.

Figure 4:
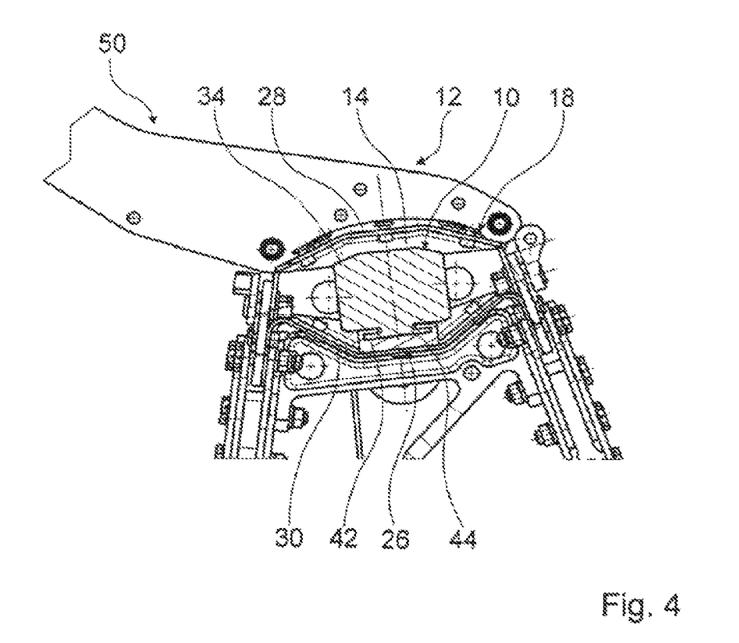
FIG. 4 is a cross sectionninal view of a schematically represented section along line IV-IV in FIG. 3.
Figure 8:
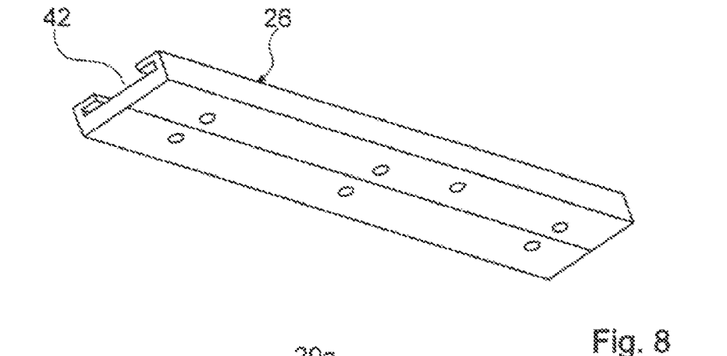
FIG. 8 is a perspective view of a slide-in fastening element of the aircraft seat device obliquely from below.

For simple mounting of the electronics unit 10, the aircraft seat device has a slide-in fastening element 26, onto which the electronics unit 10 is slid in the mounted state (FIGS. 4 and 8). The slide-in fastening element 26 is slid into the seat support beam 18 in the longitudinal direction of the latter in advance, without the electronics unit 10, and fastened therein, more specifically the slide-in fastening element 26 is screwed to the lower shell 30 of the seat support beam 18. On its top side, the slide-in fastening element 26 has a guide channel, which is formed by a longitudinal groove 42 of T-shaped cross section. On its underside, the electronics unit 10 has a T-shaped foot 44, by means of which the electronics unit 10 is slid into the T-shaped longitudinal groove 42 of the slide-in fastening element 26 and is fixed in a positive-locking manner, in particular transversely to the longitudinal extent of the seat support beam 18, in the mounted state.

Figure 10:
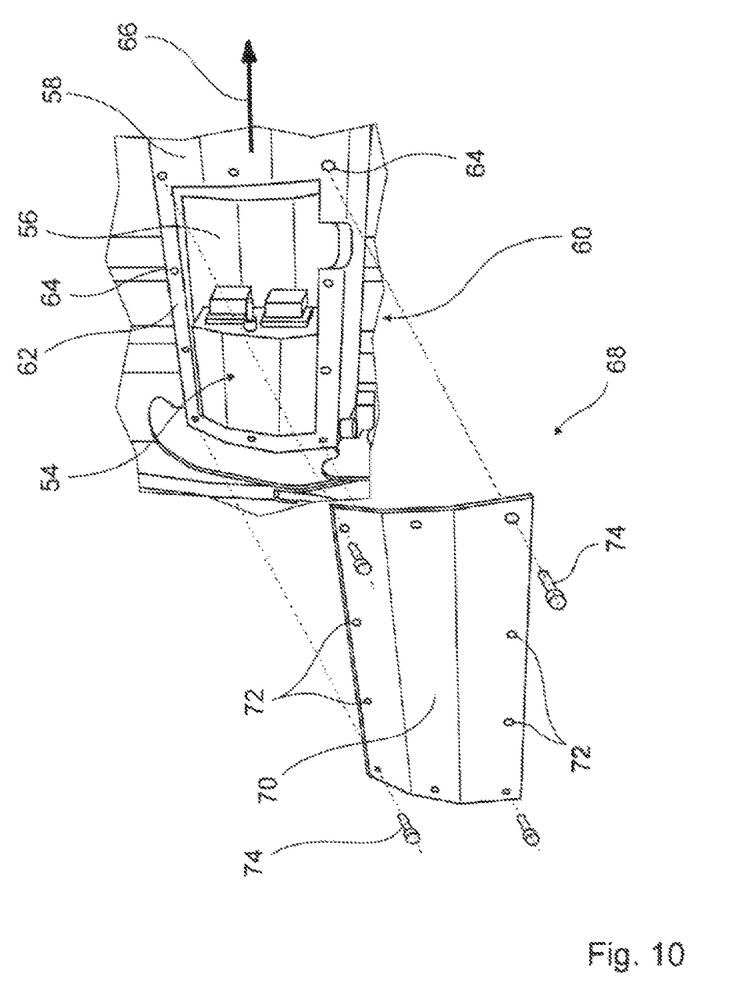
FIG. 10 is a detailed view of the aircraft seat device shown in FIG. 1, with another embodiment of a single seat support beam and an electronics unit in an installed state in a schematic view from below.

FIG. 10 shows a detail of the aircraft seat device shown in FIG. 1 with another embodiment of a single seat support beam 58 and an electronics unit 54 in an installed state. The electronics unit 54 is arranged in a hollow space 56 defined by the seat frame unit 12. In contrast to the embodiment in FIG. 1, the single seat support beam 58 of the seat frame unit 12 has an access unit 60 on an underside facing the aircraft floor 52, said access unit 60 comprising an edge region 62 of a rectangular opening in the single seat support beam 58 and a plurality of fastening means designed as threaded holes 64. The access unit 60 is provided for the purpose of allowing access to the hollow space 56 in a direction oriented perpendicularly to a main extension direction 66 of the seat frame unit 12 in a floor-mounted state of the seat frame unit 12. By virtue of the access, the electronics unit 54 can be removed easily from the hollow space 56 for installation and for maintenance or repair work.

For the purpose of covering the access to the hollow space 56, the access unit 60 furthermore has a covering unit 68, which comprises a rectangular plate 70 the dimensions of which are larger than those of the rectangular opening and which is provided with circular apertures 72, the positions of the circular apertures 72 corresponding to positions of the threaded holes 64 in the edge region 62 of the opening of the single seat support beam 58, and further comprises fastening means in the form of screws 74. The electronics unit 54 arranged, in an installed state, behind the covering unit 68 in the hollow space 56 defined by the seat frame unit 12 is thus protected from environmental influences and from unwanted interference by unauthorized persons.

Figure 11:
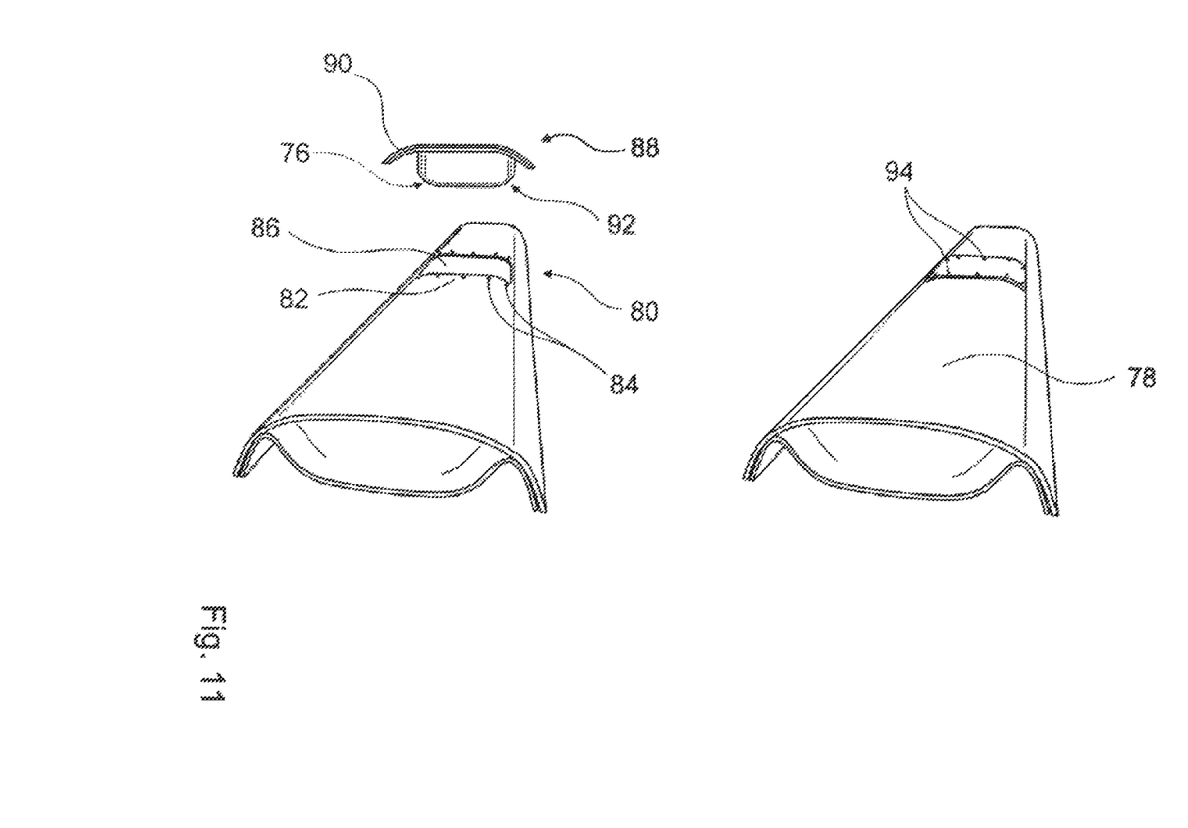
FIG. 11 is a detailed view of the aircraft seat device shown in FIG. 1, with another embodiment of a single seat support beam and an electronics unit in an installed state in a schematic side view.

FIG. 11 shows a detail of the aircraft seat device shown in FIG. 1 with another embodiment of a single seat support beam 78 and an electronics unit 76. In contrast to the embodiments in FIGS. 1 and 10, the single seat support beam 78 of the seat frame unit 12 has an access unit 80 on an upper side facing away from the aircraft floor 52, said access unit 80 comprising an edge region 82 of a rectangular opening in the single seat support beam 78 and a plurality of fastening means which are formed by threaded holes 84. The access unit 80 allows access to a hollow space 86 defined by the seat frame unit 12 (left-hand part of FIG. 11).

For the purpose of covering the access to the hollow space 86 defined by the seat frame unit 12 and to the electronics unit 76 arranged in the hollow space 86, the access unit 80 furthermore has a covering unit 88. The covering unit 88 is equipped with a fixing means 90 for fixing an installation position of the electronics unit 76. The fixing means 90, which is designed as a flange element, is securely connected to a housing unit 92 of the electronics unit 76 by means of a material bond effected by welding. Dimensions of the rectangular opening of the single seat support beam 78 and of the housing unit 92 of the electronics unit 76 are designed in such a way that the electronics unit 76 can be inserted through the rectangular opening into the hollow space 86 defined by the seat frame unit 12.

The flange element, the dimensions of which are larger than those of the rectangular opening and which is provided with circular apertures, the positions of said apertures corresponding to positions of the threaded holes 84 in the edge region 82 of the opening in the single seat support beam 78, can be fastened to the single seat support beam 78 by means of further fastening means in the form of screws 94, thereby fixing the installation position of the electronics unit 76. The right-hand part of FIG. 11 shows the electronics unit 76 in the installation state.

The flange element has an external shape which is matched to outer contours of the single seat support beam 78 of the seat frame unit 12, said contours being formed, on the one hand, by a cut with a cutting plane which is oriented in the sitting direction 122 and perpendicularly to the aircraft floor 52 and, on the other hand, by a cut with a cutting plane which is oriented perpendicularly to the sitting direction 122. As a result, the flange element is, over its full circumferential length, in contact with the single seat support beam 78 of the seat frame unit 12 in the installed state of the electronics unit 76, thus ensuring good dissipation of waste heat produced by operation of the electronics unit 76 to the seat frame unit 12.

Figure 12:
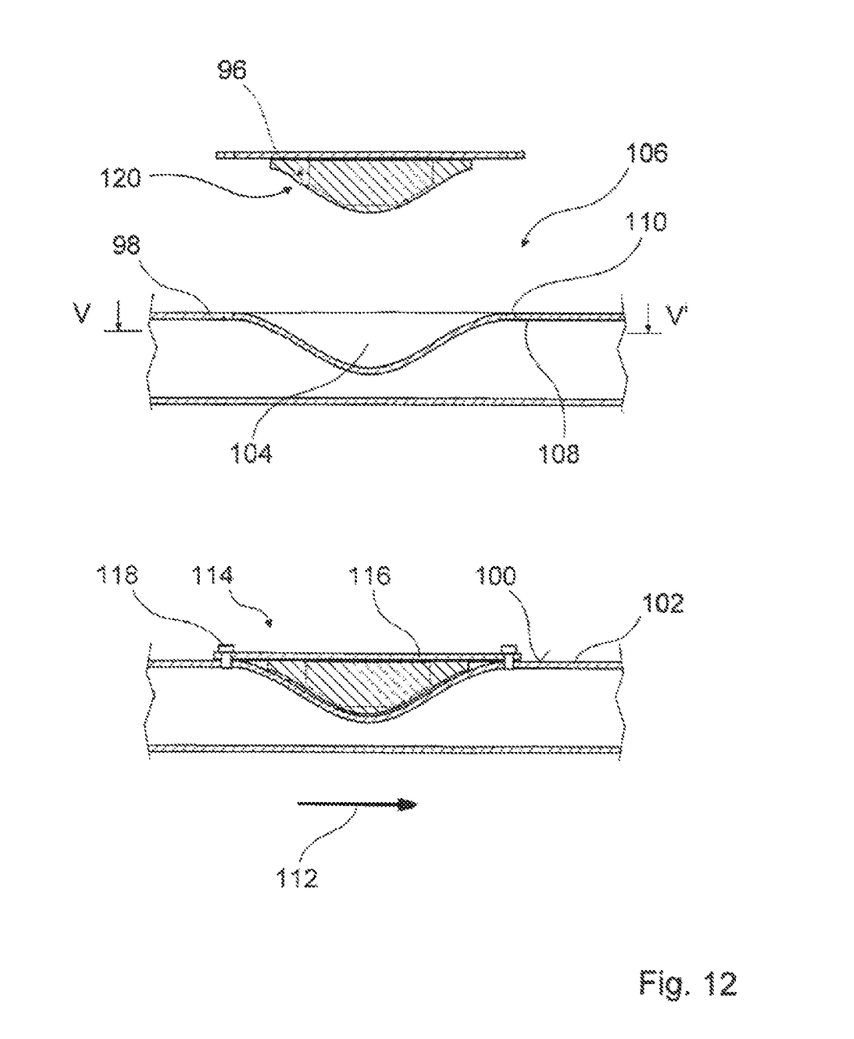
FIG. 12 is a detailed view of the aircraft seat device shown in FIG. 1 with another embodiment of a single seat support beam and an electronics unit in an installed state in a sectional representation.

A detail of the aircraft seat device shown in FIG. 1 with another embodiment of a single seat support beam and an electronics unit 96 is illustrated schematically in FIG. 12. In contrast to the embodiments in FIGS. 1, 10 and 11, the single seat support beam 98 of the seat frame unit 12 has a concave region on an outer side 100 of an outer wall 102, namely an upper side facing away from the aircraft floor 52, by means of which region the single seat support beam 98 of the seat frame unit 12 forms a hollow space 104, which is bounded by the outer side 100 of the outer wall 102 on three sides. In a section plane aligned parallel to the aircraft floor 52, at a level indicated by the line V-V', the hollow space 104 designed as a concave region has a closed profile in the form of a circle.

The single seat support beam 98 of the seat frame unit 12 has an access unit 106 which comprises an annular edge region 108 of the concave region of the single seat support beam 98 and a plurality of fastening means, which are formed by threaded holes 110. The access unit 106 is provided for the purpose of allowing, in a floor-mounted state of the seat frame unit 12, access to the hollow space 104 formed by the concave region in a direction oriented perpendicularly to a main extension direction 112 of the seat frame unit 12. By virtue of the access, the electronics unit 96 can be removed easily from the hollow space 104 for installation and for maintenance or repair work.

For the purpose of covering the access to the hollow space 104, the access unit 106 furthermore has a covering unit 114, which comprises a circular plate 116 the diameter of which is larger than that of the concave region and which is provided with circular apertures, the positions of said circular apertures corresponding to positions of the threaded holes 110 in the annular edge region 108 of the concave region of the single seat support beam 98, and which has further fastening means in the form of screws 118. The circular plate 116 of the covering unit 114 is connected securely but detachably to a housing unit 120 of the electronics unit 96 and can be separated from the latter nondestructively by means of tools. The plate 116 of the covering unit 114 thus simultaneously forms a fixing means for fixing an installation position of the electronics unit 96. The outside dimensions of the electronics unit 96 are matched to the concave region of the single seat support beam 98. The circular plate 116 of the covering unit 114 is matched, in its edge region and in a central region, to a contour of the single seat support beam 98. As a result, the covering unit 114 is, in the installed state of the electronics unit 96, in contact with the single seat support beam of the seat frame unit 12 over the full circumferential length of the covering unit 114, thus ensuring good dissipation of waste heat produced by operation of the electronics unit 96 to the seat frame unit 12. In an installed state of the electronics unit 96, the covering unit 114 furthermore forms a substantially smooth contour with the single seat support beam 98 of the seat frame unit 12, and therefore the covering unit 114 can be regarded as an extension of the outer side 100 of the outer wall 102 of the single seat support beam 98, outside the concave region. Behind the covering unit 114, the electronics unit 96 arranged in the hollow space 104 defined by the seat frame unit 12 is protected from environmental influences and from unwanted interference by unauthorized persons.

The invention claimed is:

1. An aircraft seat device comprising:
   at least one electronics unit;
   at least one seat frame unit including a single seat support beam that forms a seat support, the single support beam including an upper shell and a lower shell that communicate with each other to form a closed profile, the at least one seat frame unit including a hollow space that at least partially houses the at least one electronics unit and that is at least partially bound by the single seat support beam; and
   at least one slide-in fastening element onto which the electronics unit is slid in a mounted state.

2. The aircraft seat device as claimed in claim 1, wherein the seat frame unit has an access unit that exposes the hollow space, the access unit being positioned in a direction oriented perpendicularly to a main extension direction of the seat frame unit.

3. The aircraft seat device as claimed in claim 2, wherein the access unit comprises a covering unit that attaches to the access unit and is configured to cover the hollow space.

4. The aircraft seat device as claimed in claim 3, wherein the covering unit has a fixing means for fixing an installation position of the electronics unit.

5. The aircraft seat device as claimed in claim 4, wherein the fixing means is, in an installed state of the covering unit, at least partially matched to an outer contour of the seat frame unit.

6. The aircraft seat device as claimed in claim 1, wherein the hollow space is surrounded by a closed profile in at least one plane.

7. An electronics unit for an aircraft seat device as claimed in claim 1.

8. The aircraft seat device according to claim 1, further comprising an aircraft seat attached to the at least one seat frame unit.

9. The aircraft seat device as claimed in claim 1, wherein the seat frame unit is configured to absorb torsional moments applied to the seat component.

10. The aircraft seat device as claimed in claim 1, wherein the seat frame unit is configured to transfer torsional moments applied to the seat component.

11. An aircraft seat device comprising:
    at least one electronics unit; and
    at least one seat frame unit including a seat support beam that defines a hollow space within the seat support beam, the hollow space at least partially surrounding the at least one electronics unit, and further including at least one slide-in fastening element including at least one of a guide channel and a raised guide portion in order to guide the electronics unit when it is slid on.

12. The aircraft seat device as claimed in claim 11, wherein the slide-in fastening element includes a T-shaped cross section with a longitudinal groove, the longitudinal groove defining a top side of the guide channel.

13. An aircraft seat device comprising:
    at least one electronics unit including at least one plate plug oriented in a longitudinal direction of the at least one electronics unit and a fastening plate on a side facing the plug plate, the fastening plate being spaced apart from the plug plate in the longitudinal direction; and
    at least one seat frame unit including a single seat support beam that forms a seat support, the single support beam including an upper shell and a lower shell that communicate with each other to form a closed profile, the at least one seat frame unit including a hollow space that at least partially houses the at least one electronics unit and that is at least partially bound by the single seat support beam.

* * * * *